5/16/85 OR 4,612,243

United States Patent [19]
Shimazaki et al.
[11] Patent Number: 4,612,243
[45] Date of Patent: Sep. 16, 1986

[54] REUSABLE HEAT-SENSITIVE TRANSFER ELEMENT

[75] Inventors: Yoshikazu Shimazaki, Osaka; Suekichi Shimizu, Takatsuki; Nobuyuki Nakajima, Nara, all of Japan

[73] Assignee: Fuji Kagakushi Kogyo Co., Ltd., Osaka, Japan

[21] Appl. No.: 746,352

[22] Filed: Jun. 19, 1985

[30] Foreign Application Priority Data

Jun. 26, 1984 [JP] Japan ............................... 59-131455

[51] Int. Cl.⁴ ........................ B41M 5/025; B32B 5/16

[52] U.S. Cl. ................................ 428/321.3; 346/219; 428/332; 428/484; 428/488.1; 428/913; 428/914

[58] Field of Search ..................... 428/321.3, 195, 914, 428/913, 488.1, 484, 332; 346/219

[56] References Cited

FOREIGN PATENT DOCUMENTS 0039383 11/1981 European Pat. Off. ......... 428/321.3
0183297 10/1983 Japan ............................... 428/321.3

*Primary Examiner*—Thomas J. Herbert
*Attorney, Agent, or Firm*—Thomas L. Tully

[57] ABSTRACT

A reusable heat-sensitive transfer recording element which comprises a foundation and an ink-containing layer provided on the foundation, said ink-containing layer comprising porous particles impregnated with a heat-meltable ink and a binder material for bonding the particles to each other, said binder material being substantially incompatible with the heat-meltable ink. With the present transfer elements, printed images having a high optical density can be obtained from the initial use thereof and printed images having such high optical density can be obtained at every repeated use.

11 Claims, No Drawings

REUSABLE HEAT-SENSITIVE TRANSFER ELEMENT

BACKGROUND OF THE INVENTION

The present invention relates to a reusable heat-sensitive transfer recording media. More particularly, it relates to a heat-sensitive transfer recording element which is used in recording apparatuses such as thermal printer and thermal typewriter, and which is capable of transferring small portions of the heat-meltable ink which is present in some portion of the ink layer thereof, onto a receiving medium such as paper, at every time when that portion of the ink layer is heated by means of a thermal head, whereby the same portion of the ink layer can be used many times.

Such reusable heat-sensitive transfer recording element which have been known heretofore include a recording element having a sponge-like ink layer which has such a construction that a heat-meltable ink is contained in a sponge-like layer made of a resin incompatible with the heat-meltable ink (see Japanese Unexamined Patent Publication No. 54-68253), and a recording element having an ink layer which is formed from a mixture of a heat-meltable ink and minute particles having a strong cohesive force and has a barrier layer which is formed by aggregation of the particles and serves as a barrier against migration of the ink in a molten state (see Japanese Unexamined Patent Publication No. 57-160691).

In the case of the former, however, the ink is contained in the sponge-like layer in such state that the ink is enveloped in the resin which constitutes the sponge-like layer, which results in a low optical density (hereinafter referred to as "OD") of the initial printed image. Accordingly, it is impossible to obtain printed images having a high OD value from initial use of the recording media.

In the case of the latter, since the porosity of the aggregation of the minute particles is low, the ink content in the ink layer is low, which results in a low OD value of printed images and a small number of times that the recording element can be used repeatedly.

It is an object of the invention to provide a reusable heat-sensitive transfer recording element which can be used many times and gives printed images having a high OD value from the initial use thereof.

This and other objects of the invention will become apparent from the description hereinafter.

SUMMARY OF THE INVENTION

The present invention provides a reusable heat-sensitive transfer recording element which comprises a foundation and an ink-containing layer provided on the foundation, said ink-containing layer comprising porous particles impregnated with a heat-meltable ink and a binder material for bonding the particles to each other, said binder material being substantially incompatible with the heat-meltable ink. According to the recording element, printed images having a high OD value can be obtained from the inital use thereof and printed images having such high OD value can be obtained at every repeated use.

DETAILED DESCRIPTION

According to the reusable heat-sensitive transfer recording element of the present invention, small portions of the heat-meltable ink contained in the particles which exist in some portion of the ink layer is allowed to flow out from the particles and transferred onto a receiving medium such as paper to give a printed image, at every time when that portion of the ink layer is heated by means of a thermal head and the ink in that portion is melted. That is, the heat-meltable ink contained in the porous particles in some portion of the ink layer is allowed to flow out little by little at every time when that portion of the ink layer is used repeatedly. Therefore, the same portion of the ink layer can be used many times to transfer the heat-meltable ink onto a receiving medium until the ink in that portion is exhausted.

In the present invention, the heat-meltable ink is contained in porous particles which are bonded to each other by the binder material, differing from the conventional recording media using the sponge-like ink layer wherein the heat-meltable ink exists in such state that the ink is developed in the resin. Therefore, the recording media of the present invention have an advantage that the heat-meltable ink is allowed to flow out easily from the ink layer and transferred onto a receiving medium by a small amount of heating energy, as compared with the above-mentioned conventional recording media. Further, the ink content in the ink layer having the above-mentioned construction is higher than that of the conventional recording media using the aggregation of minute particles. As a result, printed images having a high OD value can be obtained at every repeated use.

The above facts enable multi-time heat-sensitive transfer recording using the recording media of the present invention where the OD value of printed images obtained in the initial use is high and printed images having such high OD value can be obtained at every repeated use.

The present invention will be described more concretely.

The porous particles used in the present invention are minute particles having a high porosity. The particles preferably have an average particle size of 1 to 20 μm, particularly 2 to 15 μm and an average porosity of 50 to 97%, particularly 60 to 93%. Herein the terminology "average porosity" is intended to mean an average value of a ratio of the total volume of pores contained in each particle to the volume of each particle over a bulk or mass of the particles, i.e. powder. Herein the terminology "porous powder" is used to mean a bulk or mass of the porous particles. When the average particle size is less than 1 μm, most of particles are covered with the binder material, which hinders the outflow of the molten ink from the particles. When the average particle size is more than 20 μm, defects tend to occur in portions of printed image, which results in the lowering of quality of printed image. When the average porosity is less than 50%, the number of times of use is remarkably decreased and the OD value of printed image also is sharply lowered as the recording media is used repeatedly. When the average porosity is more than 97%, the rigidity of the particles is lowered, which invites the danger that the particles are broken when they are mixed with a binder material.

Examples of the particles include, for instance, inorganic porous powders such as diatomaceous earth, zeolite and bentonite, and organic porous powders such as pore powder made of polyurethane.

The binder material used in the present invention is suitably a resinous material which is incompatible or slightly compatible with the hot-meltable ink, has an adhesiveness against the foundation of the recording media and the porous particles, and is not melted upon heating with a thermal head. Thermoplastic resins having a softening temperature of not less than 70° C. or thermosetting resins can be used as a binder material. Typical examples of the binder material are polyester resin, vinyl acetate-vinyl chloride compolymer, styrene resin, polycarbonate resin, cellulose acetate butyrate, polyamidimide resin and epoxy resin. Those resins may be used alone or as admixtures of two or more kinds thereof. One or more suitable additives may be added in an appropriate amount to the binder material.

The binder material is used preferably in an amount of 0.5 to 15 parts by weight, particularly 1 to 12 parts by weight, per 10 parts by weight of the porous powder.

As the heat-meltable ink, there can be used any heat-meltable inks composed of components similar to those of usual solid inks used heretofore for heat-sensitive transfer recording media. However, suitable heat-meltable inks are those which have a viscosity of 10 to 500 cP (Brookfield viscometer) at a temperature by 30° higher than the meltint temperature of the hot-meltable ink and a melting temperature which ranges from 50° to 120° C. and is lower than the softening temperature of the binder material. Coloring agents used in the present invention include coloring agents in chromatic colors such as blue, red and yellow colors as well as black coloring agents such as carbon black. Printed images having a variety of colors can be obtained by using such chromatic color coloring agents. Any chromatic color coloring agents used in conventional one-time heat-sensitive transfer recording media can be used.

The heat-meltable ink is used preferably in an amount of 3 to 20 parts by weight per 5 parts by weight of the porous powder.

The porous particles are impregnated with the molten mass of the heat-meltable ink. The impregnation can be carried out by the following two methods. In the one method, a molten ink and porous particles are mixed in a mixing apparatus such as despa, whereby the porous particles are impregnated with the ink. In the other method, a mixture of a molten ink and porous particles is supplied in a vacuum-impregnating apparatus; and subjected to vacuum-impregnation.

The porous particlae impregnated with the heat-meltable ink in such manner as in the above are mixed with a solution of the binder material under the condition that the ink is in a molten state. The resulting mixture is applied onto a foundation and dried to give an ink-containing layer. The ink-containing layer after being dried, preferably has a thickness of 1 to 20 μm. The solvent used for preparing the solution of the binder material is selected preferably from those which do not dissolve both the hot-meltable ink and the porous particles.

Examples of the foundation used in the present invention include, for instance, plastic films such as polyester film, polycarbonate film, nylon film and polypropylene film; moisture-proof cellophane; high density papers such as condenser paper and glassine paper; and thin sheet materials which are produced by depositing a metal on one surface or both surfaces of the foregoing material or by laminating a metal foil on one surface or both surfaces of the foregoing material.

The present invention will now be more particularly described with reference to the following Examples. These Examples are intended to illustrate the invention and not be construed to limit the scope of the invention. It is to be understood that various changes and modifications may be made in the invention without departing from the spirit and scope thereof.

EXAMPLES 1 TO 4

The porous powder shown in Table 1 was impregnated with the hot-meltable ink shown in Table 2. The impregnation was carried out by subjecting a mixture of the molten ink and the powder to vacuum impregnation in a vacuum-impregnating apparatus. The porous powder impregnated with the ink in such manner was mixed with the binder material solution shown in Table 1 under the condition that the ink was in a molten state. The resulting solution was applied onto the foundation shown in Table 1 and dried to remove the solvent, yielding an ink-containing layer having the thickness shown in Table 1.

TABLE 1

| | Porous powder | | | | Amount of heat-meltable ink (shown in Table 2) |
|---|---|---|---|---|---|
| | Kind | Average particle size (μm) | Porosity (%) | Amount (parts by weight) | (parts by weight) |
| Ex. 1 | Celite HST (Note 1) | 10 | 77.0 | 10 | 20 |
| Ex. 2 | Dicalite 479 (Note 2) | 7 | 85.1 | 1 | 3 |
| Ex. 3 | Celite FC (Note 3) | 5 | 82.0 | 2 | 3 |
| Ex. 4 | Celite Super Floss (Note 4) | 5 | 85.0 | 4 | 5 |

| | Binder material solution | | | | Foundation | | Thickness of ink-containing layer after being dried (μm) |
|---|---|---|---|---|---|---|---|
| | Binder material | | Solvent | | | | |
| | Kind | Amount (parts by weight) | Kind | Amount (parts by weight) | Kind | Thickness (μm) | |
| Ex. 1 | Vylon #200 (Note 5) | 1 | Methyl ethyl ketone<br>Toluene | 50<br>20 | Polyethylene terephthalate | 6 | 15 |
| Ex. 2 | Cellulose acetate butyrate | 1 | Methyl ethyl ketone | 6 | Condenser paper | 10 | |
| Ex. 3 | Cellulose acetate butyrate | 1 | Methyl ethyl ketone<br>Toluene | 8<br>6 | Polyethylene terephthalate | 6 | 10 |
| Ex. 4 | Denkavinyl #1000 LT3 | 1 | Methyl ethyl ketone | 28 | Polyethylene terephthalate | 6 | 15 |

TABLE 1-continued

| |
|---|
| (Note 6) |

Note
1: Zeolite made by Johns Manville International Corp.
2: Perlite made by Dicalite Orient Corp.
3: Zeolite made by Johns Manville International Corp.
4: Zeolite made by Johns Manville International Corp.
5: Polyester resin made by Toyobo Co., Ltd.
6: Vinyl acetate-vinyl chloride copolymer made by Asahi Denka Kogyo Kabushiki Kaisha

TABLE 2

(Heat-meltable ink)

| | Main component of vehicle | Main component of coloring agents | Melting temperature (°C.) | Melt viscosity (Note 2) (cP) |
|---|---|---|---|---|
| Ex. 1 | Paraffin (145° F.) | Carbon black | 65 | 50 |
| Ex. 2 | Beeswax | Oil black HBB (Note 1) | 65 | 120 |
| Ex. 3 | Carnauba wax | Carbon black Oil black HBB (Note 1) | 80 | 200 |
| Ex. 4 | Polyoxyethylene sorbitol | Black toner | 63 | 162 |

Note
1: Oil dye made by Oriento Kagaku Kabushiki Kaisha
2: Viscosity measured at a temperature by 30° C. higher than the melting temperature.

COMPARATIVE EXAMPLE 1

This comparative example demonstrates Example 1 of the above-mentioned Japanese Unexamined Patent Publication No. 54-68253.

A hot meltable ink composed of 4 parts by weight of carbon black, 7 parts by weight of carnauba wax and 11 parts by weight of castor wax was miced with a solution of 10 parts by weight of vinyl chloride-vinyl acetate copolymer in a mixed solvent composed of 51 parts by weight of ethyl acetate and 17 parts by weight of toluene. The resulting mixture was applied onto a carbonizing paper and dried to give a sponge-like ink layer having a thickness of 10 μm.

COMPARATIVE EXAMPLE 2

This comparative example demonstrates Example 1 of the above-mentioned Japanese Unexamined Patent Publication No. 57-160691.

To a mixed solvent composed of 5 parts by volume of isopropyl alcohol and 5 parts by volume of toluene were added 3 parts by weight of an azo-type black dye, 5 parts by weight of polyethylene glycol and 5 parts by weight of a finely powdered carbon black having an average particle size of 23 mμ as a powder having a strong cohesive force. The resulting mixture was applied onto a condenser paper and dried to give an ink layer having a thickness of 25 μm.

Printing test was carried out using the recording media obtained in Examples 1 to 4 and Comparative Examples 1 and 2 in a thermal printer (WP-55 made by Canon Inc.). Printing was carried out ten times on a white recording paper with using the same portion of the recording media. The OD value of the obtained printed images was measured by Macbeth densitometer. The results are shown in Table 3.

TABLE 3

| Number of times of printing | OD value Ex. 1 | Ex. 2 | Ex. 3 | Ex. 4 | Com. Ex. 1 | Com. Ex. 2 |
|---|---|---|---|---|---|---|
| 1 | 1.01 | 0.83 | 0.92 | 0.94 | 0.52 | 0.48 |
| 2 | 1.10 | 0.95 | 0.90 | 1.03 | 0.58 | 0.45 |
| 3 | 0.92 | 0.92 | 0.88 | 0.90 | 0.70 | 0.32 |
| 4 | 0.89 | 0.88 | 0.82 | 0.82 | 0.72 | 0.25 |

TABLE 3-continued

| Number of times of printing | OD value Ex. 1 | Ex. 2 | Ex. 3 | Ex. 4 | Com. Ex. 1 | Com. Ex. 2 |
|---|---|---|---|---|---|---|
| 5 | 0.78 | 0.84 | 0.75 | 0.76 | 0.66 | <0.1 |
| 6 | 0.64 | 0.81 | 0.72 | 0.72 | 0.67 | " |
| 7 | 0.62 | 0.76 | 0.63 | 0.60 | 0.67 | " |
| 8 | 0.55 | 0.71 | 0.54 | 0.59 | 0.62 | " |
| 9 | 0.46 | 0.62 | 0.48 | 0.48 | 0.53 | " |
| 10 | 0.42 | 0.59 | 0.42 | 0.48 | 0.53 | " |

When printing was carried out using a conventional one-time heat-sensitive transfer ink ribbon, the OD values of the printed images obtained in the initial printing range from 1.1 to 1.3.

In addition to the ingredients or elements used in the Examples, other ingredients or elements can be used in the Examples as set forth in the specification to obtain substantially the same results.

What we claimed is:

1. A reusable heat-sensitive transfer recording element comprising a foundation having thereon an ink-containing layer comprising porous particles having an average particle size of from about 1 to 20 μm and an average porosity of from about 50% to 97%, said particles being impregnated with a heat-meltable ink which is heat-transferable in increments during repeated use, and a binder material which binds said particles to each other and to said foundation, said binder material being substantially incompatible with said heat-meltable ink and being non-meltable under conditions of use.

2. A recording element according to claim 1 in which said particles have an average particle size of from about 2 to 15 μm.

3. A recording element according to claim 1 in which said particles have an average porosity of from about 60% to 93%.

4. A recording element according to claim 1 in which said binder material is a resinous binder material having a softening temperature of not less than 70° C.

5. A recording element according to claim 1 in which said ink-containing layer comprises from 0.5 to 15 parts by weight of said binder material per 10 parts by weight of said impregnated porous particles.

6. A recording element according to claim 1 in which said heat-meltable ink comprises a waxy binder material and coloring matter.

7. A recording element according to claim 1 in which said ink-containing layer comprises from 3 to 20 parts by weight of said heat-meltable ink per 5 parts by weight of said porous particles.

8. A recording element according to claim 1 in which said porous particles comprise zeolite.

9. A recording element of claim 1, wherein the heat-meltable ink has a viscosity 10 to 500 cP at a temperature by 30° C. higher than the melting temperature of the ink and a melting temperature of 50 to 120° C.

10. A recording element of claim 1 in which said foundation is selected from the group consisting of plastic film, paper and combinations of each with a thin metal layer.

11. A recording element of claim 1 in which said ink-containing layer is provided on said foundation as a coating composition containing a volatile solvent which is subsequently evaporated.

* * * * *

UNITED STATES PATENT AND TRADEMARK OFFICE

CERTIFICATE OF CORRECTION

PATENT NO. : 4,612,243

DATED : September 16, 1986

INVENTOR(S) : Shimazaki, et al.

It is certified that error appears in the above-identified patent and that said Letters Patent are hereby corrected as shown below:

Col. 1, line 7, "media" should be --element--;

Col. 2, line 18, "developed" should be --enveloped--;

Col. 3, line 23, "meltint" should be --melting--

Col. 4, line 3, "particlae" should be--particles--

Col. 4, line 5 from the bottom, under TABLE 1, (second section - Example 2, last column, under "Thickness...", the blank space should read --10--;

Col. 5, line 33, "miced" should be --mixed--.

Signed and Sealed this

Third Day of February, 1987

*Attest:*

DONALD J. QUIGG

*Attesting Officer* *Commissioner of Patents and Trademarks*